(12) United States Patent
Spannuth

(10) Patent No.: US 12,239,894 B2
(45) Date of Patent: Mar. 4, 2025

(54) ADJUSTABLE FORCE SENSOR SYSTEM

(71) Applicant: Spannuth Biomechanics LLC, Boulder, CO (US)

(72) Inventor: Ben Spannuth, Lander, WY (US)

(*) Notice: Subject to any disclaimer, the term of this patent is extended or adjusted under 35 U.S.C. 154(b) by 212 days.

(21) Appl. No.: 17/733,804

(22) Filed: Apr. 29, 2022

(65) Prior Publication Data
US 2022/0347540 A1 Nov. 3, 2022

Related U.S. Application Data

(60) Provisional application No. 63/182,679, filed on Apr. 30, 2021.

(51) Int. Cl.
| | | |
|---|---|---|
| *A63B 69/00* | (2006.01) | |
| *A63B 24/00* | (2006.01) | |
| *G01L 1/14* | (2006.01) | |
| *G01L 1/16* | (2006.01) | |

(Continued)

(52) U.S. Cl.
CPC ...... *A63B 69/0048* (2013.01); *A63B 24/0062* (2013.01); *G01L 1/146* (2013.01); *G01L 1/16* (2013.01); *G01L 1/18* (2013.01); *G01L 1/22* (2013.01); *A63B 2214/00* (2020.08);
(Continued)

(58) Field of Classification Search
CPC ............ A63B 69/0048; A63B 24/0062; A63B 2214/00; A63B 2220/51; A63B 2220/833; A63B 2225/02; G01L 1/146; G01L 1/16; G01L 1/18; G01L 1/22
See application file for complete search history.

(56) References Cited

U.S. PATENT DOCUMENTS

| | | | |
|---|---|---|---|
| 8,668,626 B1 * | 3/2014 | Horowitz ........... | A63B 71/0605 482/37 |
| 2005/0245355 A1 | 11/2005 | Brewer | |
| 2010/0004098 A1 | 1/2010 | Hensley | |

(Continued)

FOREIGN PATENT DOCUMENTS

| | | | | |
|---|---|---|---|---|
| CN | 106215395 A | * | 12/2016 | ......... A63B 69/0048 |
| DE | 3811857 | * | 11/1989 | ......... A63B 69/0048 |

(Continued)

OTHER PUBLICATIONS

Philip F. Ferrara III, "Advanced Rock Climbers Exhibit Greater Finger Force and Resistance to Fatigue Compared to Novices During Treadwall Climbing", Preprint Article, MedRxiv.org, Publication Date: Apr. 29, 2020, https://doi.org/10.1101/2020.04.27.20077560.

(Continued)

*Primary Examiner* — Sundhara M Ganesan
*Assistant Examiner* — Jacqueline N L Loberiza
(74) *Attorney, Agent, or Firm* — University of Colorado Entreprenurial Law Clinic

(57) ABSTRACT

An adjustable climbing wall system enabling the arrangement of a force sensor with an attached climbing hold in various positions attached to a frame or wall. The system comprises a subframe element that is configured to a couple with a force plate. The subframe element is configured to be adjustable from a first position to a second position. The force plate is configured to couple with a climbing hold and the force sensor is configured to output a signal indicative of the forces applied to the climbing hold.

18 Claims, 21 Drawing Sheets

(51) Int. Cl.
    *G01L 1/18*     (2006.01)
    *G01L 1/22*     (2006.01)

(52) U.S. Cl.
    CPC ..... *A63B 2220/51* (2013.01); *A63B 2220/833* (2013.01); *A63B 2225/02* (2013.01)

(56) References Cited

U.S. PATENT DOCUMENTS

2018/0369630 A1* 12/2018 Sudeith .................. A63B 9/00
2020/0023257 A1    1/2020 Speed

FOREIGN PATENT DOCUMENTS

| DE | 3811857 C  | * | 11/1989 | ......... A63B 21/4035 |
| DE | 20312543 U1 | * | 1/2004 | ......... A63B 69/0048 |
| FR | 2555454 A | * | 5/1985 | ......... A63B 69/0048 |
| FR | 3017305 A1 | * | 8/2015 | ......... A63B 69/0048 |

OTHER PUBLICATIONS

Shawn D. Russell, "Computer models offer new insights into the mechanics of rock climbing", Journal Article, Sports Technology, Aug.-Nov. 2012; 5(3-4): 120-131,Publication Date: Dec. 21, 2012, https://doi.org/10.1080/19346182.2012.749831.

* cited by examiner

ADJUSTABLE FORCE SENSOR SYSTEM

CROSS REFERENCE TO RELATED APPLICATIONS

This application claims the benefit of U.S. Provisional Patent Application No. 63/182,679, filed on Apr. 30, 2021, the contents of which are herein incorporated by reference in their entirety.

TECHNICAL FIELD

Embodiments related to the present disclosure generally relate to force sensor measurement systems. More specifically, the present disclosure relates to a force sensor system with adjustable elements.

BACKGROUND

Force sensor systems can be used in sports performance training to help an athlete improve their performance, efficiency, strength or other desirable metric. Force sensor systems can include force sensors that are attached to a user or other objects and operative to measure various parameters such as force, acceleration, work, impulse, movement paths or other metrics related to athletic performance. In many cases, sensor systems for sport performance training tend to be application specific and include a diverse range of sensors, and attachment methods that are tailored to the specific data that is desired. In some cases, sports performance sensor systems may include various fixtures or other devices that interface with one or more sensors.

SUMMARY

Some embodiments of the present disclosure relate to an adjustable force sensor system that can arrange a force sensor in various positions on a framework. Specifically, some embodiments relate to a suspended framework made of an outer portion and an adjustable inner portion. In some embodiments the inner framework has cross-elements that slide along the outer framework across an x-axis direction, and also has adjustment elements that slide along the cross-elements in a y-axis direction. Furthermore, some embodiments include a force sensor attached to the adjustment elements, and the force sensor is able to transmit force data to a processing unit.

In one embodiment of the present disclosure the adjustment element is capable of sliding along the cross-element and extending in an outwardly fashion in a z-axis direction. In some embodiments of the present disclosure the force sensor is attached to the adjustment element using a mounting bracket, where the bracket is rotatable along multiple axes. The force sensor can also be designed such that a climbing hold can be attached. In some cases, the climbing hold can be a rock-climbing hold, an ice climbing hold, or a dry-tooling hold. The ability to adjust the position of the force sensor allows for measurements of a user that more closely reflect movement patterns undertaken during various sports of interest.

Some embodiments of the present disclosure include a motor and location sensor, enabling the force sensor to be adjusted via control of the motor, and the location of the force sensor can be transmitted to a processing unit. In some cases, the motor and force sensor work to position the adjustment element to a user-defined position symmetrical about an axis to an earlier position. The ability to adjust the force sensor to a symmetrical position enables data collection of a movement pattern mirroring that of an earlier movement pattern, thus facilitating the identification of asymmetries and inferior movement patterns.

Some embodiments of the present disclosure include a motion tracking system. The motion tracking system can collect positional, velocity, and acceleration data of a user's body segments on the adjustable force measurement system in relation to the climbing holds. The motion tracking system can also transmit the positional data to a processing unit. The motion tracking system enables the collection of body segment positions of a user as they may change over time, which can be applied to create a biomechanical model of the user that includes the user's movements for a period of interest.

Another embodiment of the current disclosure is a method of teaching movement utilizing an adjustable force measurement system, one or more force plates, and an electronic hardware component. The method can include using one or more force plates. The force plates can be attached to the adjustable force measurement system and are positioned for use to measure a force applied by a user. The force plates can be calibrated at their position and forces applied by a user are measured at the first and second force plates. Each limb of the user in a closed chain kinetic movement applies force to a force plate, in some embodiments. In some cases, the force measurements from the first and second force plate are collected by the electronic hardware component and used in combination with a user biometric, such as bodyweight and/or height, to compute a normalized force value. In some embodiments of the present disclosure, the user can repeatedly apply forces to the first and second force plate in a number of trials, and the electronic hardware component can compare normalized force values of each trial, or to expert determined force values predetermined by an operator. The normalized force values and expert determined force values can be associated with a time dimension, such as a minimum, maximum, average, rate of change, area under a curve, or a profile of a force-time graph. This method of teaching movement can help an operator determine efficient and inefficient movement patterns of the user. In some embodiments, the method of teaching movement includes rock climbing holds attached to the force plates, on which the user applies forces during various movements.

One embodiment of the current disclosure includes an adjustable climbing wall system made up of an outer frame, a sensor array, and a climbing hold. The sensor array can adjustably attach to the outer frame such that the arrangement of sensors attached to the frame can be manipulated by a user. The sensor array can be designed to enable a climbing hold to be attached to a sensor on the array in a fashion allowing a user to grab the climbing hold. In some cases, the array is designed so that a sensor can telescope or extend out from the rest of the array and be positioned at various angles, allowing the attached climbing hold to be grabbed by a user applying a variety of forces, depending on the angle of the climbing hold.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

Corresponding reference characters indicate corresponding parts throughout the several views.

Figure 1:
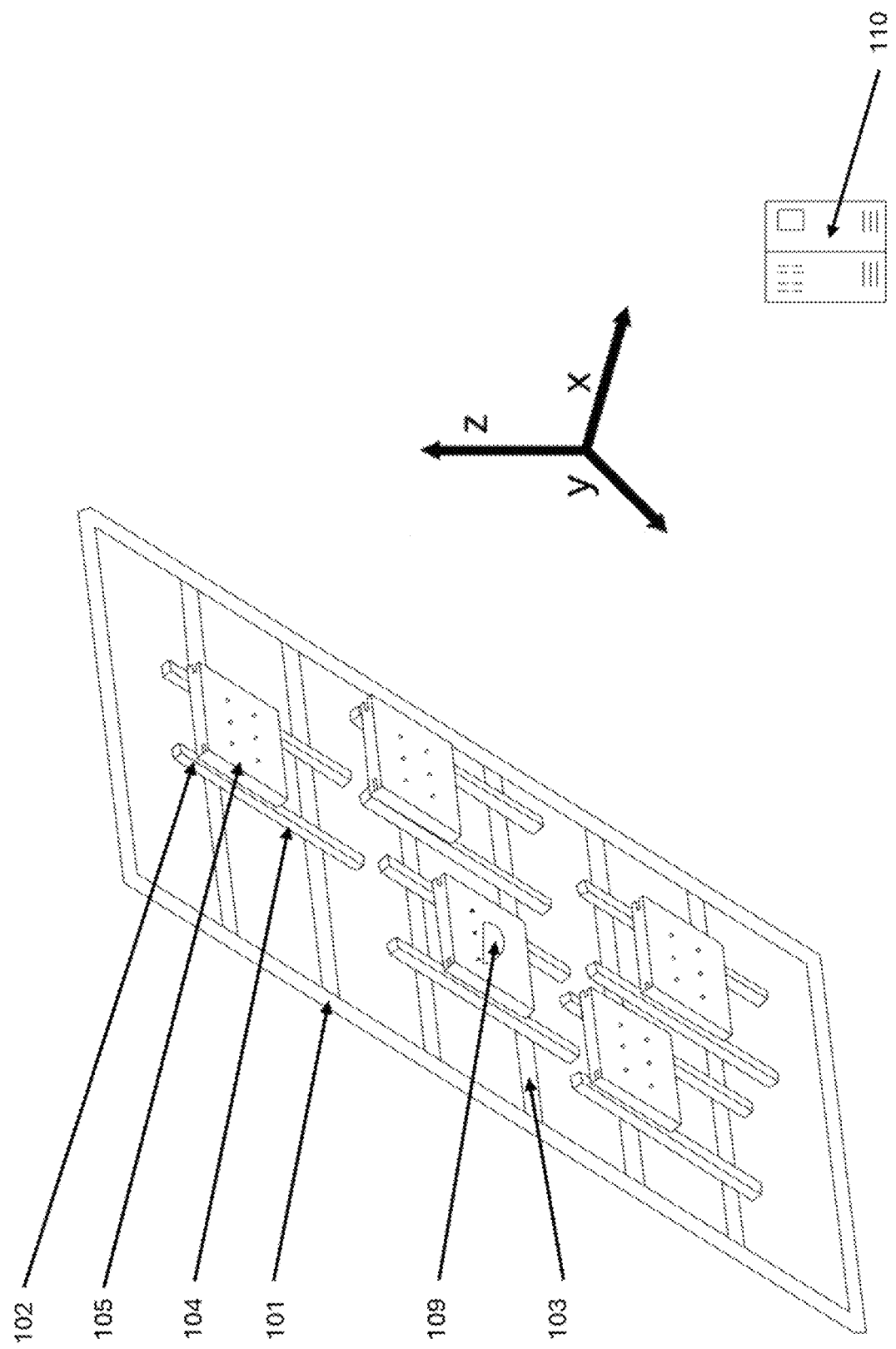
FIG. 1 illustrates a side perspective view of an adjustable force measurement system, according to embodiments of the present disclosure.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

Embodiments of the present disclosure include an adjustable climbing wall system, where a subframe enables a force plate to be adjustably positioned and the force plate has a sensor capable of measuring force exerted onto the force plate.

Figure 2:
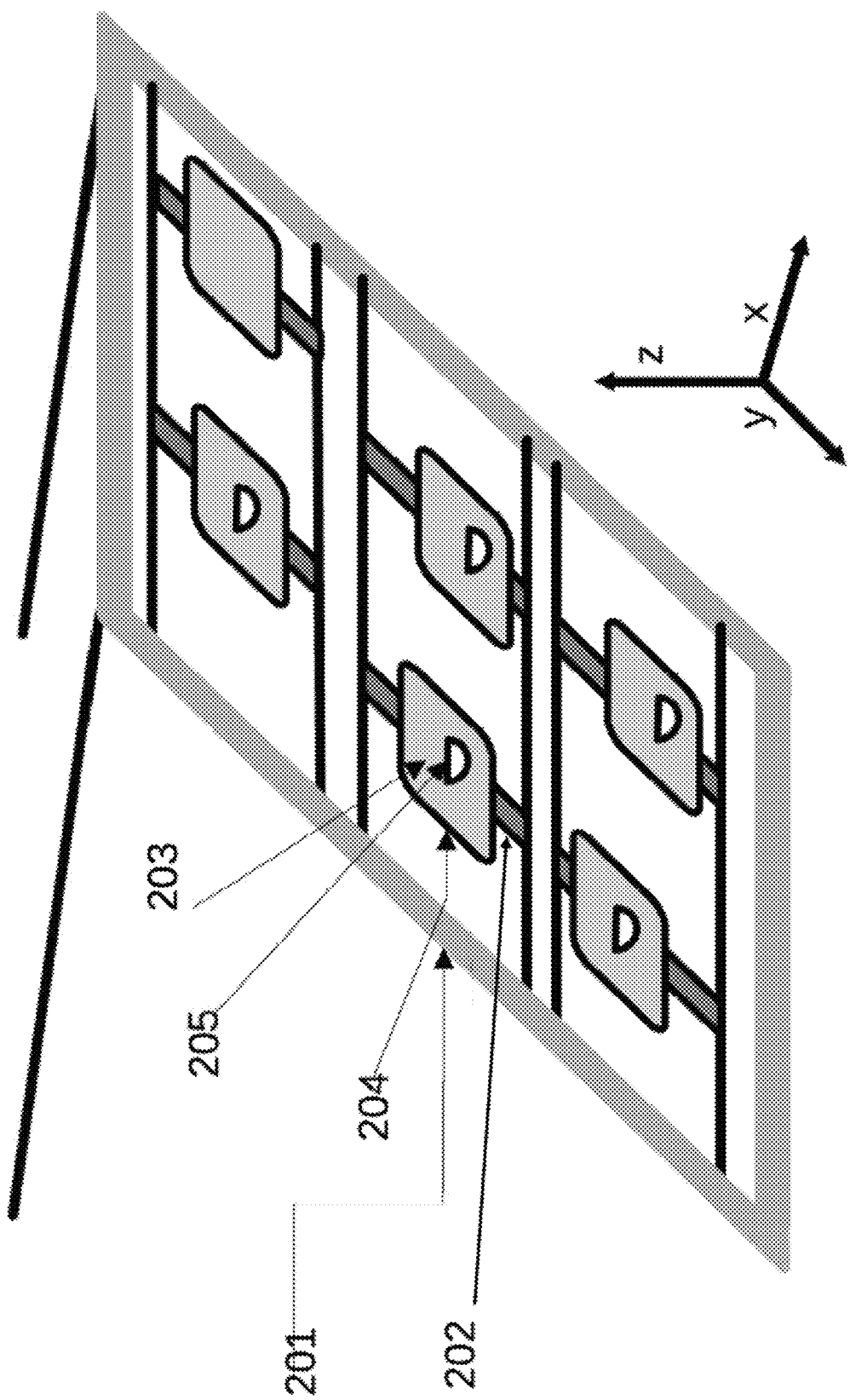
FIG. 2 illustrates a side perspective view of an adjustable climbing wall system, according to embodiments of the present disclosure.

FIG. 2 and FIG. 4 illustrates an embodiment of an adjustable climbing wall system, which includes at least one subframe element 202, which is designed to couple with a force plate 204 and a climbing hold 205. The subframe element 202 can be configured so that the force plate 204 is movable between a first position and a second position, with respect to the subframe element 202. In some cases, the subframe element 202 is configured to couple with a climbing wall structure 201. As used herein the term "climbing wall structure" can mean any structure, apparatus, or wall used or intended to be used for the purpose of climbing on, and can in some cases be freestanding. In some embodiments, a force sensor 203 is couple to the force plate 204 and is configured to measure forces exerted on the force plate 204 and/or climbing hold 205, and output a signal indicative of the measured forces.

According to some embodiments, the elements (e.g., 201, 202, 401, 402, 403, 404, 405, 406, 407, 408, 1305, 1302, 1304, 1306, 1303, 1307, 1301) of the adjustable climbing wall measurement system can be made of wood, metal, composite, polymers, or any combination thereof. As used herein the term "force sensor" can include, but is not limited to, a single or multi-pedestal force sensor of varying transducer types, such as: strain gauges, piezoelectric sensors, capacitance gauges, piezoresistive sensors, or combinations thereof. In some embodiments the force sensor has a three-dimensional component, and can be polyhedron shaped and/or a curved solid. In some cases, the force sensor is an AMTI BMS464506 force plate system.

Figure 4A:
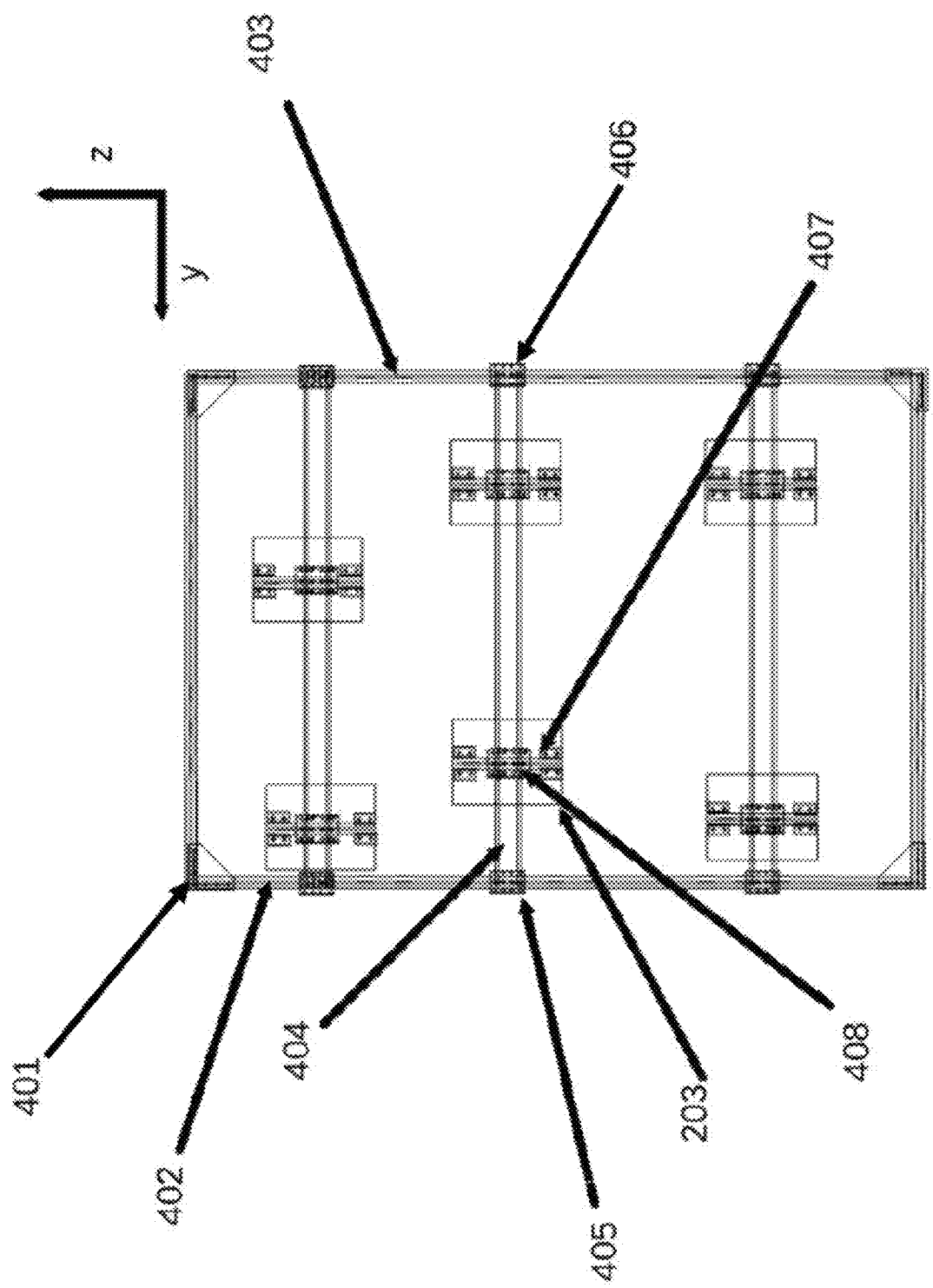
FIG. 4A illustrates a rear elevation view of an adjustable climbing wall, according to embodiments of the present disclosure.

In some embodiments, as illustrated in FIG. 4A there is a rigid frame 401 with first 402 and second side rails 403, where the first and second side rails are substantially parallel, and a bracing element 404 that has a first end 405 coupled to the first side rail 402 and a second end 406 coupled to the second side rail 403. In some cases, the subframe element 202 is configured to move with respect to the bracing element 404. In some embodiments the subframe element 202 has a rail structure 407 and the force plate 204 has a slide 408 that couples with the rail structure 407 so that the force plate 204 can move in a linear direction along an X axis and/or a Y axis with respect to the subframe element 202.

Figure 4B:
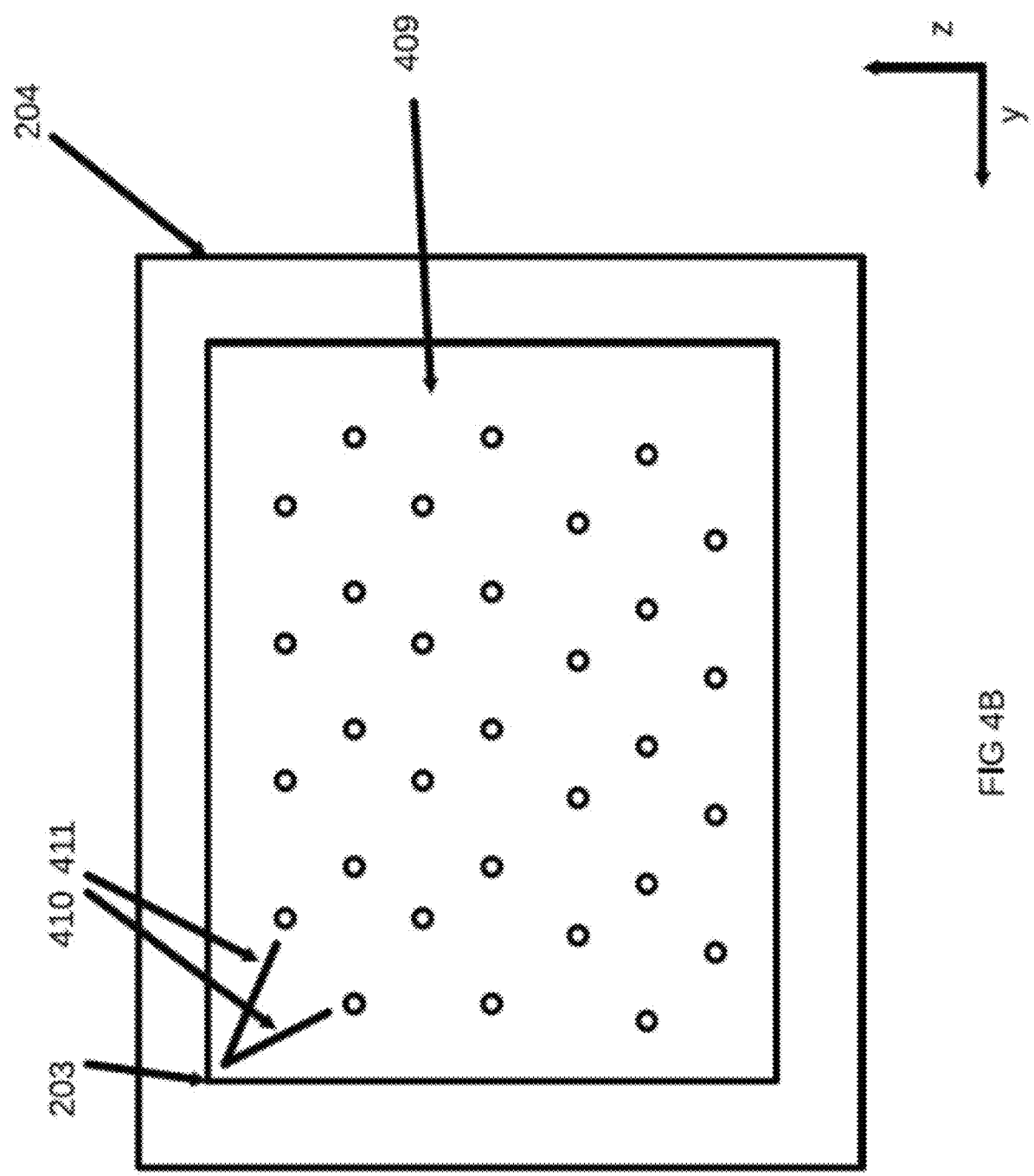
FIG. 4B illustrates a front elevation view of a force plate, according to embodiments of the present disclosure.

In some embodiments, as illustrated in FIG. 4B, the force plate 204 has a grid of apertures 409 with offset rows where the apertures are configured to receive a fastening feature operable to attach the climbing hold 205. In order to avoid distorting force measurements, in some cases, the offset nature of the apertures 409 enables the distances 410 and 411 from the force sensor 203 to the two closest apertures, from two different rows, to be substantially equal.

Figure 13:
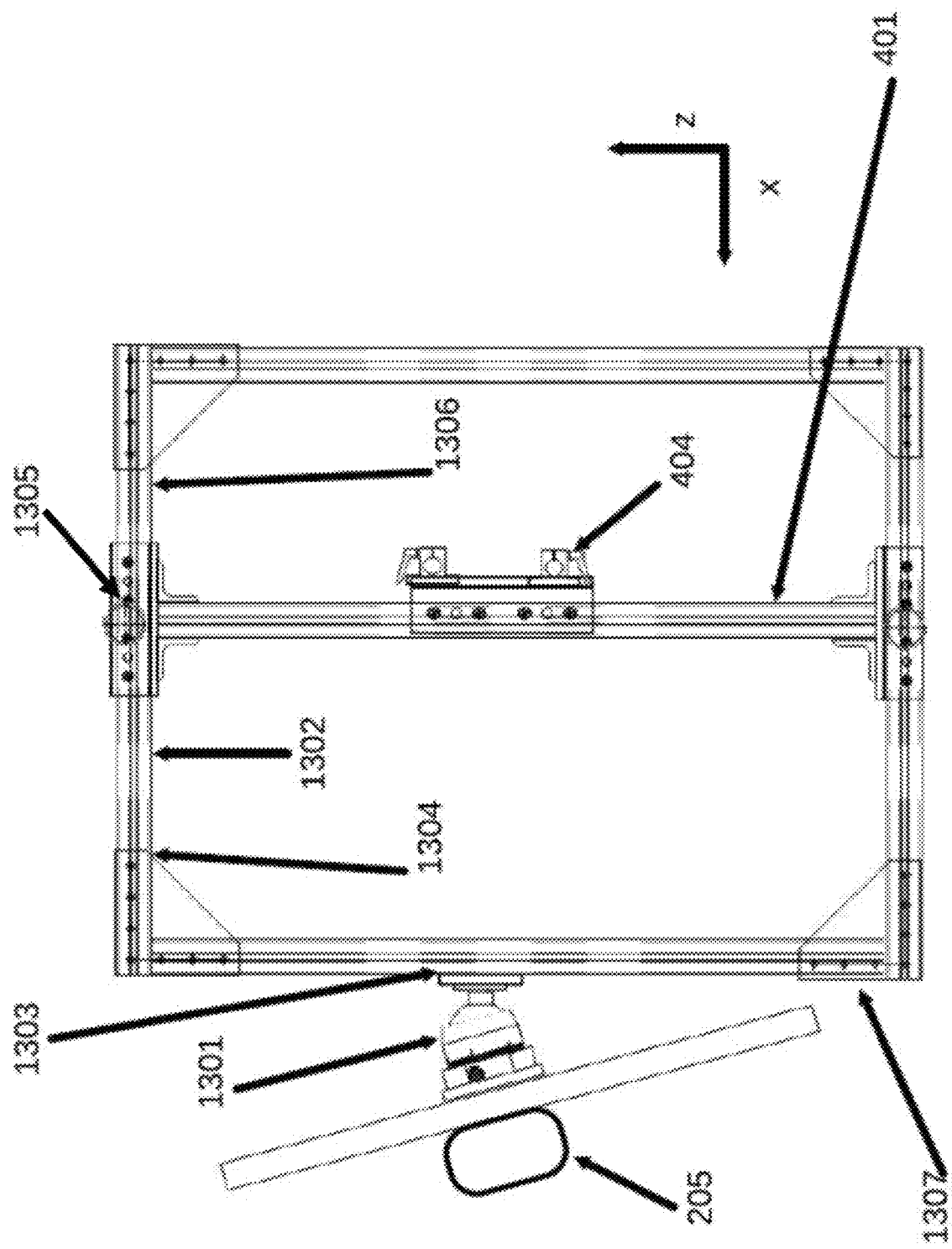
FIG. 13 illustrates a side elevation view of a subframe element, according to embodiments of the present disclosure.

In some embodiments, as illustrated in FIG. 13, the subframe element 202 is configured to rotatably couple the force plate 204 to the climbing structure 201. In some cases, a mounting bracket 1301 enables the force plate 204 to be rotated along a first degree of rotation. The mounting bracket 1301 can also be designed to enable the force sensor 203 to be rotated along a second degree of rotation. In some cases, the mounting bracket 1301 is a quick release ball head, as shown in FIG. 13.

In some embodiments, as illustrated in FIG. 13 the subframe element 202 has a coupler 1307 that couples the force plate to the subframe and is configured to vary the distance between the force plate and the climbing wall structure. In some cases, the coupler 1307 has a slide coupling 1305 and a sliding portion 1302. The sliding portion 1302 has a first end 1304, a second end 1306, and a mounting portion 1303. The sliding portion 1302 is configured to slide through the sliding coupling 1305 from the first end 1304 to the second end 1306. The mounting portion 1303 is configured to couple with the mounting bracket 1301. In some cases, the subframe element 202 is configured to vary the distance along a linear direction substantially orthogonal to a surface of the climbing wall structure 201. In some embodiments, the subframe element 202, in combination with the bracing element 404, and/or the mounting bracket 1301, can accommodate adjustment of the force plate 204 and climbing hold 205 in x, y, and z-axis directions, and in some cases, angles of rotation about a point of the mounting bracket 1301, as shown in FIG. 13.

Figure 17:
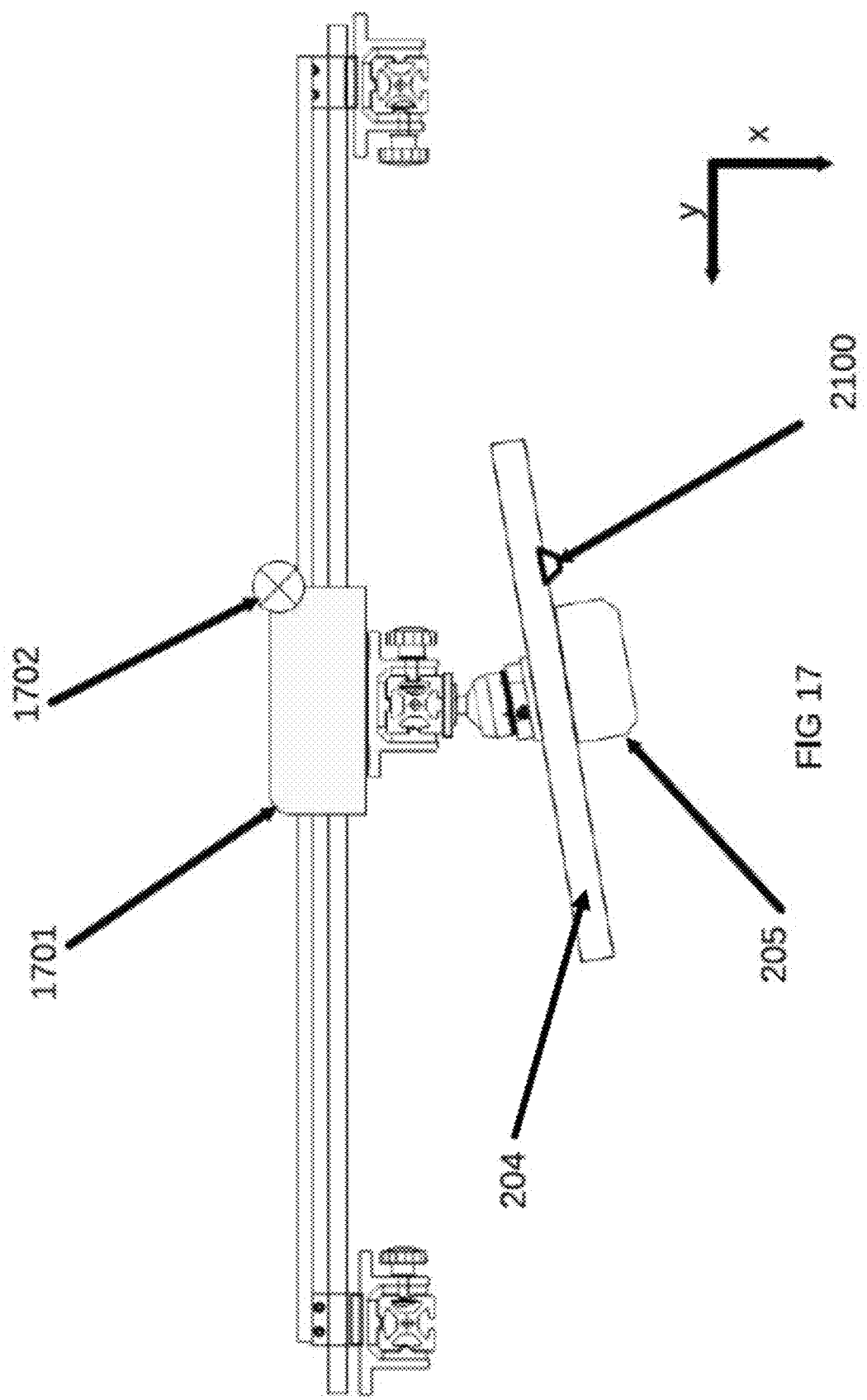
FIG. 17 illustrates a top elevation view of a subframe element, motor, and location sensor, according to embodiments of the present disclosure.

FIG. 17 illustrates an embodiment in which the adjustable wall climbing system mas a motor 1701 that is configured to move the force plate 204 between the first and second positions. The adjustable wall system can also have a locating feature 1702 that is configured to retain the force plate in at least one of the first position or the second position. In some cases, the bracing element 404 includes the motor 1701 and a location sensor 1702. The bracing element including the motor 404 and location sensor 1702 can act as the locating feature, in some cases. In some embodiments, the locating feature is a series of apertures on the subframe 202, rail 407, first 402 or second side rail 403, and/or climbing wall structure 201; used in combination with a pin to secure and or retain the force plate in the first position. In some embodiments, the motor 1701 is configured on the bracing element 404 to be coupled to the subframe element 202. The motor 1701 is also configured so that it can movably adjust the subframe element 202 from a first position to a second position. The location sensor 1702 is configured to transmit the first position and the second position to a processing unit. In some cases, the location sensor 1702 is configured to receive a signal from a processing unit, and send a signal to the motor 1701, causing the adjustment of the subframe element 202 and climbing hold 205.

An embodiment, as illustrated in FIG. 17, of the present disclosure includes a light emitting diode 2100 configured to couple to the force plate 204. In some cases, the force plate 204 is configured to send a signal to the light emitting diode 2100 from the processing unit.

Figure 3:
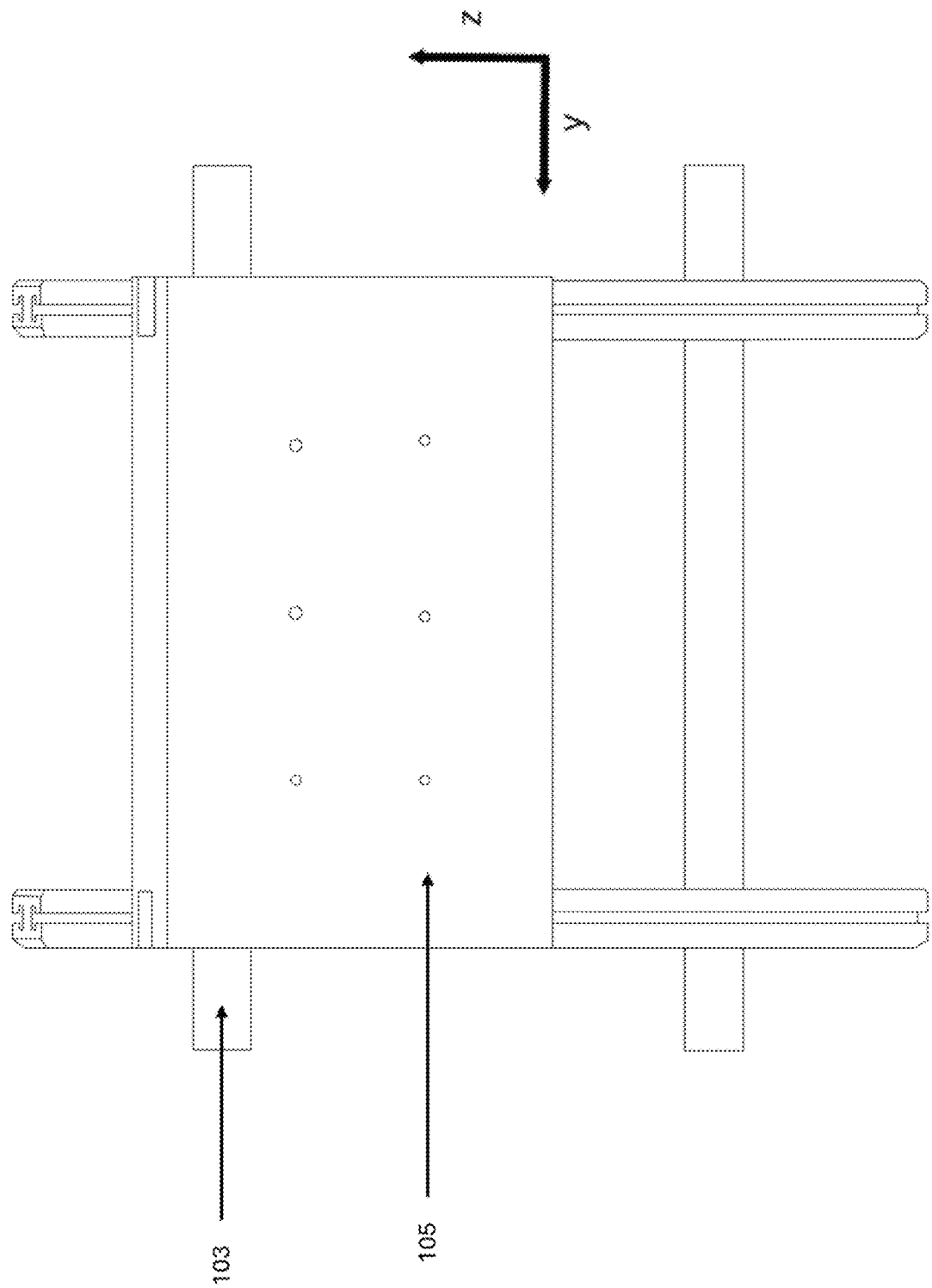
FIG. 3 illustrates a front elevation view of a cross-element and adjustment element, according to embodiments of the present disclosure.
Figure 5:
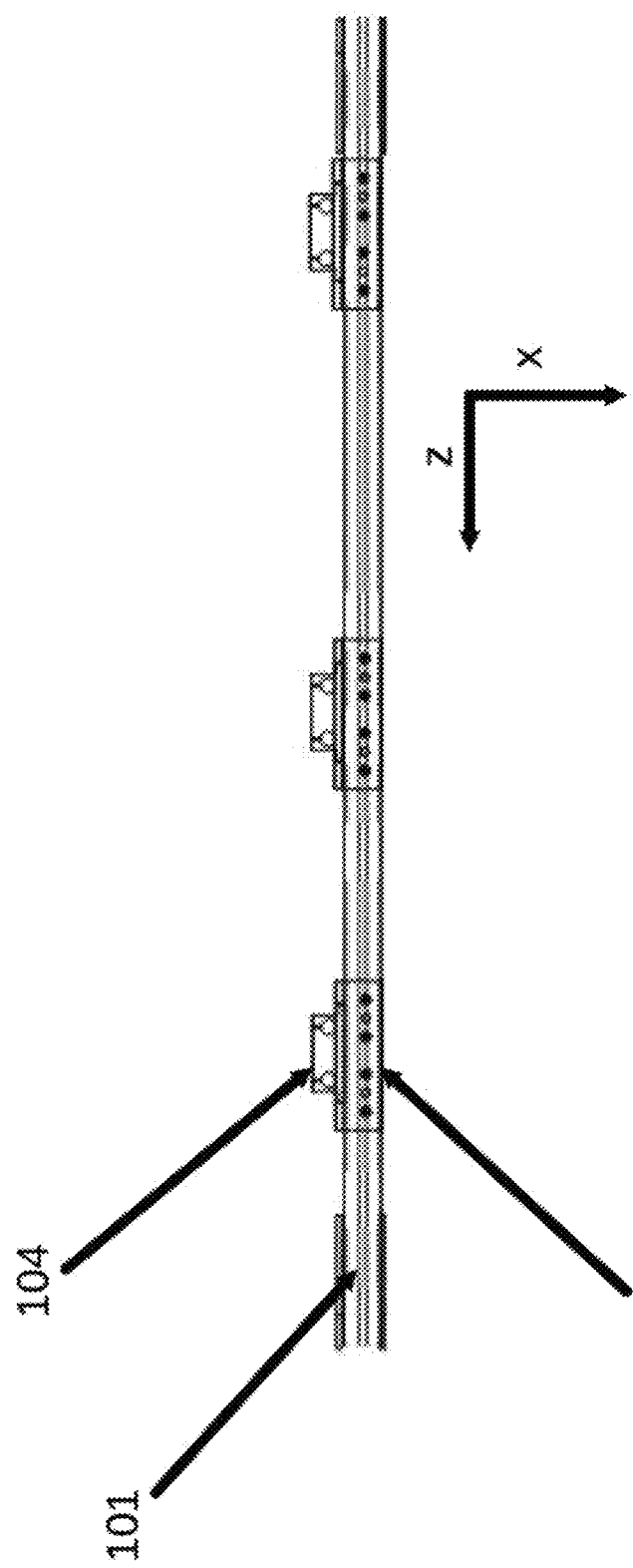
FIG. 5 illustrates a side elevation of an adjustable force measurement system, according to embodiments of the present disclosure.
Figure 6:
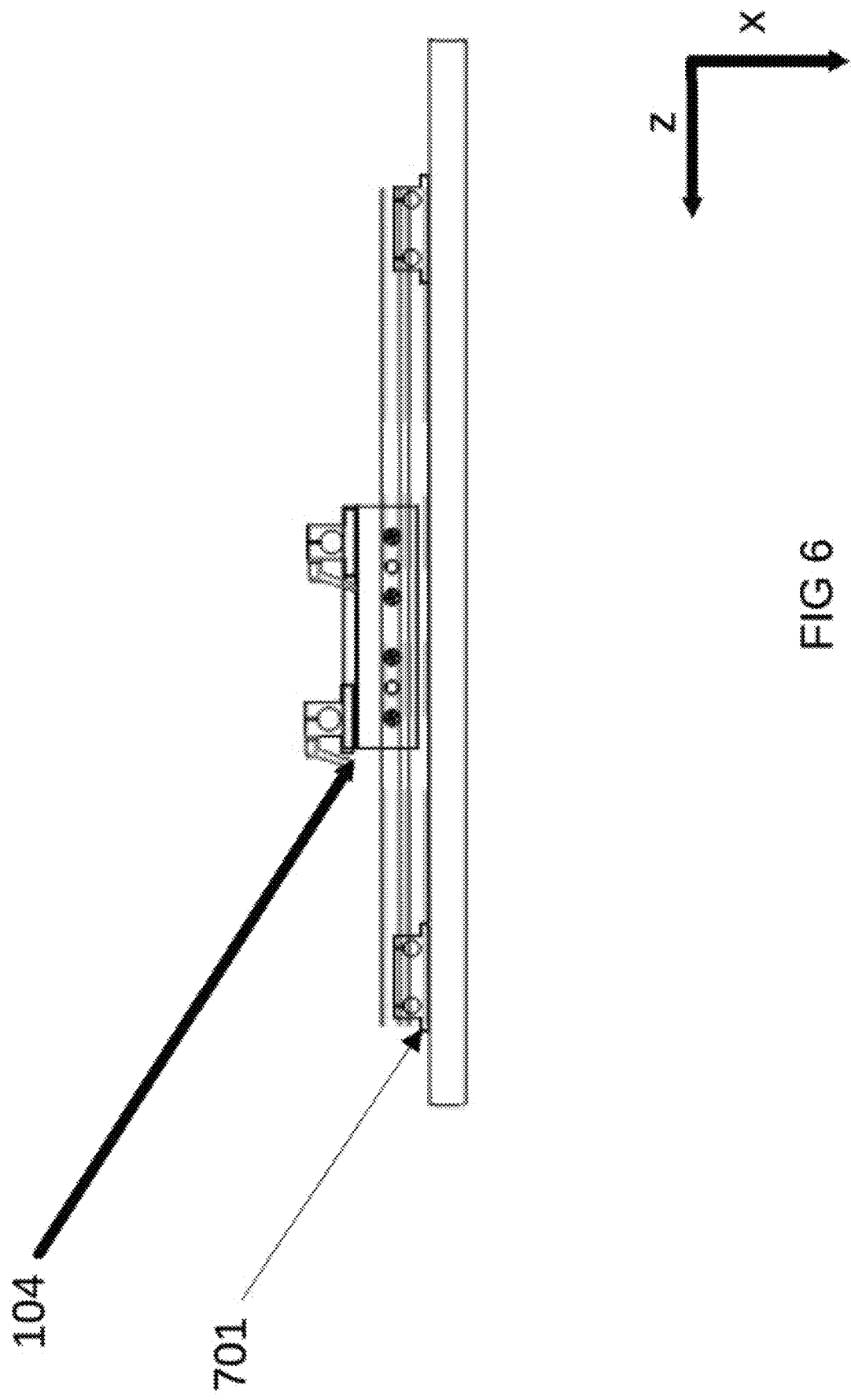
FIG. 6 illustrates a side elevation view of an adjustment element and a mounting bracket, according to embodiments of the present disclosure.
Figure 7:
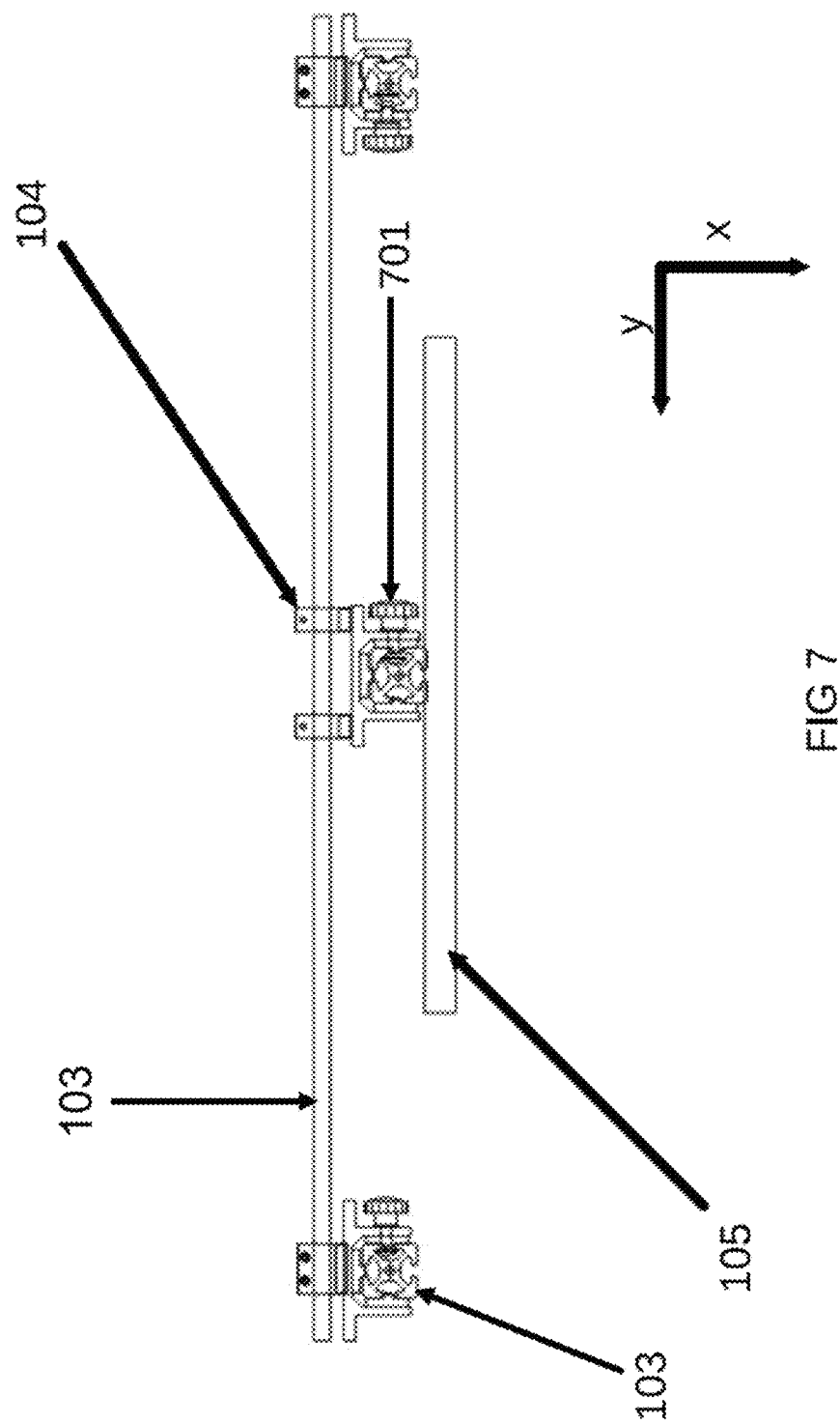
FIG. 7 illustrates a top elevation view of a cross-element, adjustment element, mounting bracket, and force sensor, according to embodiments of the present disclosure.
Figure 14:
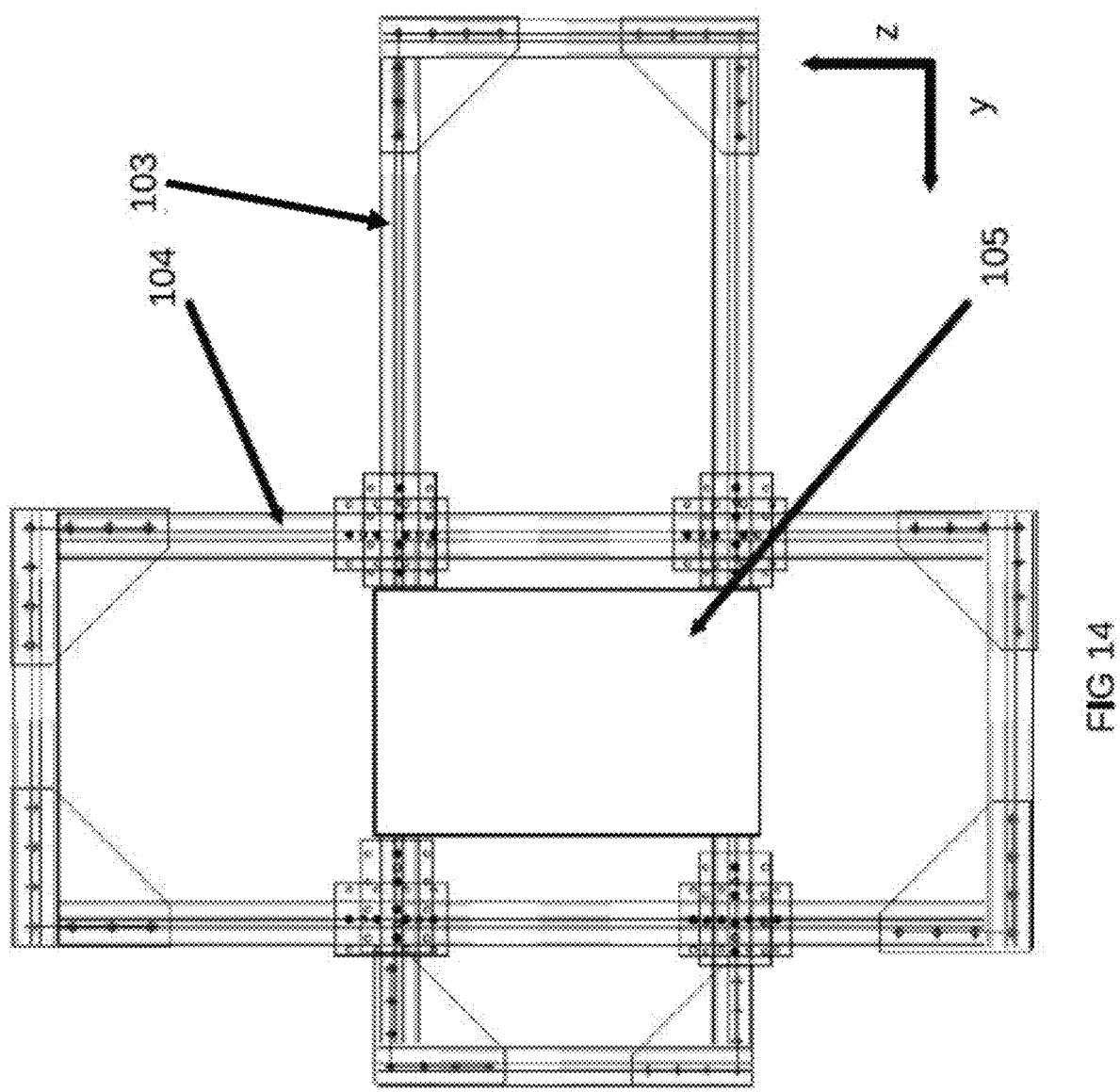
FIG. 14 illustrates a front elevation view of a cross-element, adjustment element, and force sensor, according to embodiments of the present disclosure.

As shown in FIG. 1, in one embodiment, an adjustable force sensor system 100 includes an inner portion 102. The inner portion can be configured to be mounted to another structure framework, and/or configured in a freestanding configuration. The inner portion 102 can be designed so that it can securely couple to a framework 101, in some cases. The inner portion 102 can have a cross-element 103 that can be configured to couple with the framework 101, and/or a wall 2006. In some cases, the cross-element 103 coupling is configured so that cross-element 103 slides along the framework 101, as shown in FIG. 5 and FIG. 14. The inner portion 102 can also have an adjustment element 104 that can couple to the cross-element 103. The coupling of the cross-element 103 to the adjustment element 104 is such that the adjustment element 104 can slide along the length of the cross-element 103, as shown in FIG. 3. In some embodiments, a force sensor 105 is also configured to couple with the adjustment element 104 via a mounting bracket 701, as shown in FIG. 6. In some cases, the mounting bracket 701 is configured to slide along the length of the adjustment element 104, as shown in FIG. 7. The force sensor 105 is configured to transmit data to a processing unit 110.

According to some embodiments, the elements (e.g., 100, 102, 103, 104, 701, 1101, 1102, 1103, 1104, 1105), of the adjustable force sensor measurement system can be made of wood, metal, composite, polymers, or any combination thereof. As used herein the terms "coupling", "coupled", and "couple" mean to join two or more elements in manner so that the positions of said elements can be: positioned, rigidly secured, loosened, oriented to a new position, and rigidly secured at the new position. As used herein the term "processing unit" can include, but is not limited to, a computer, smart phone, microprocessor, microcontroller, transceiver, or combination thereof. The force sensor can transmit data to the processing unit via a wired connection, wireless signal, optical signal, or combination thereof.

Figure 8:
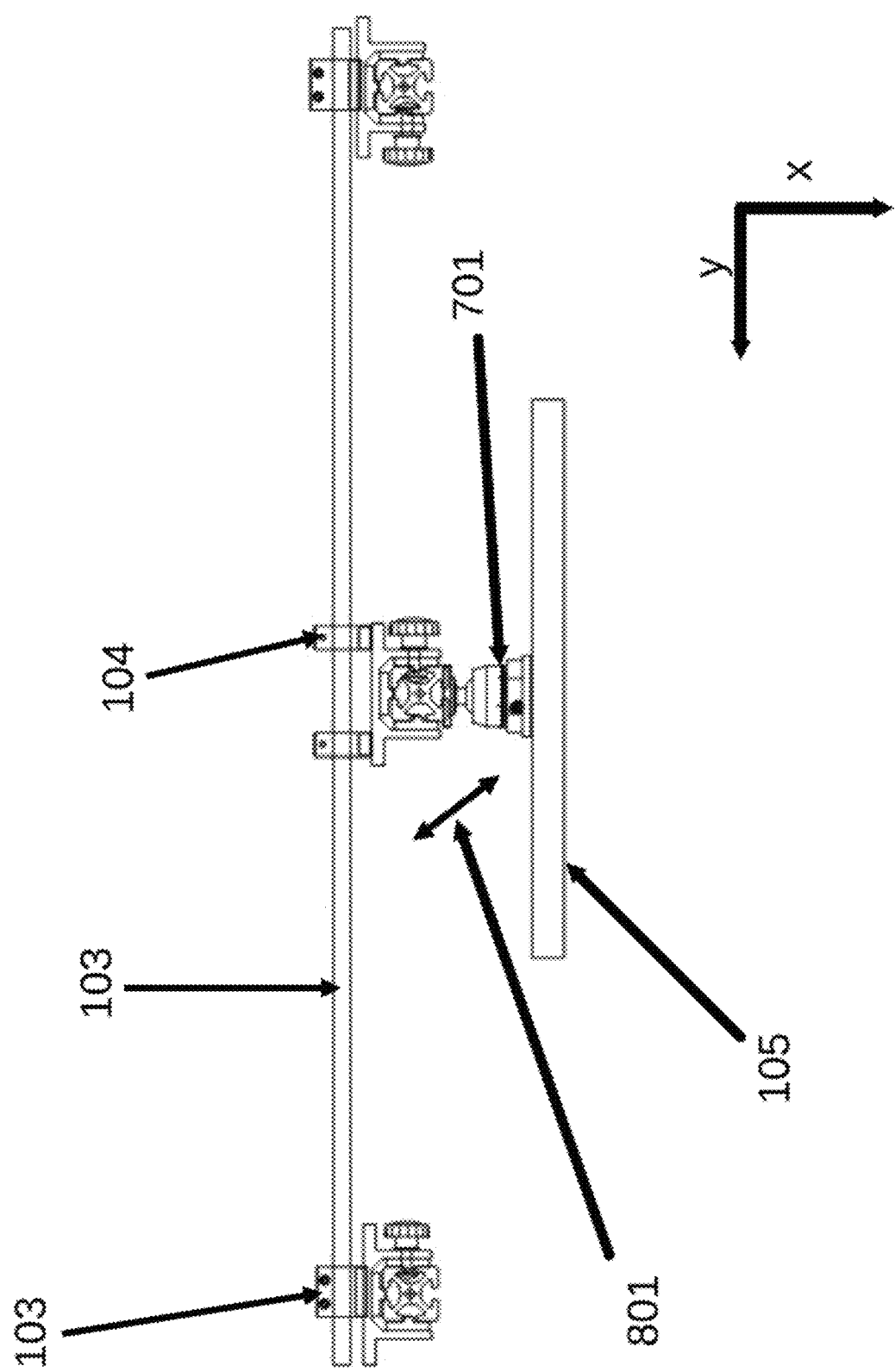
FIG. 8 illustrates a top elevation view of a cross-element, adjustment element, mounting bracket, and force sensor, according to embodiments of the present disclosure.
Figure 9:
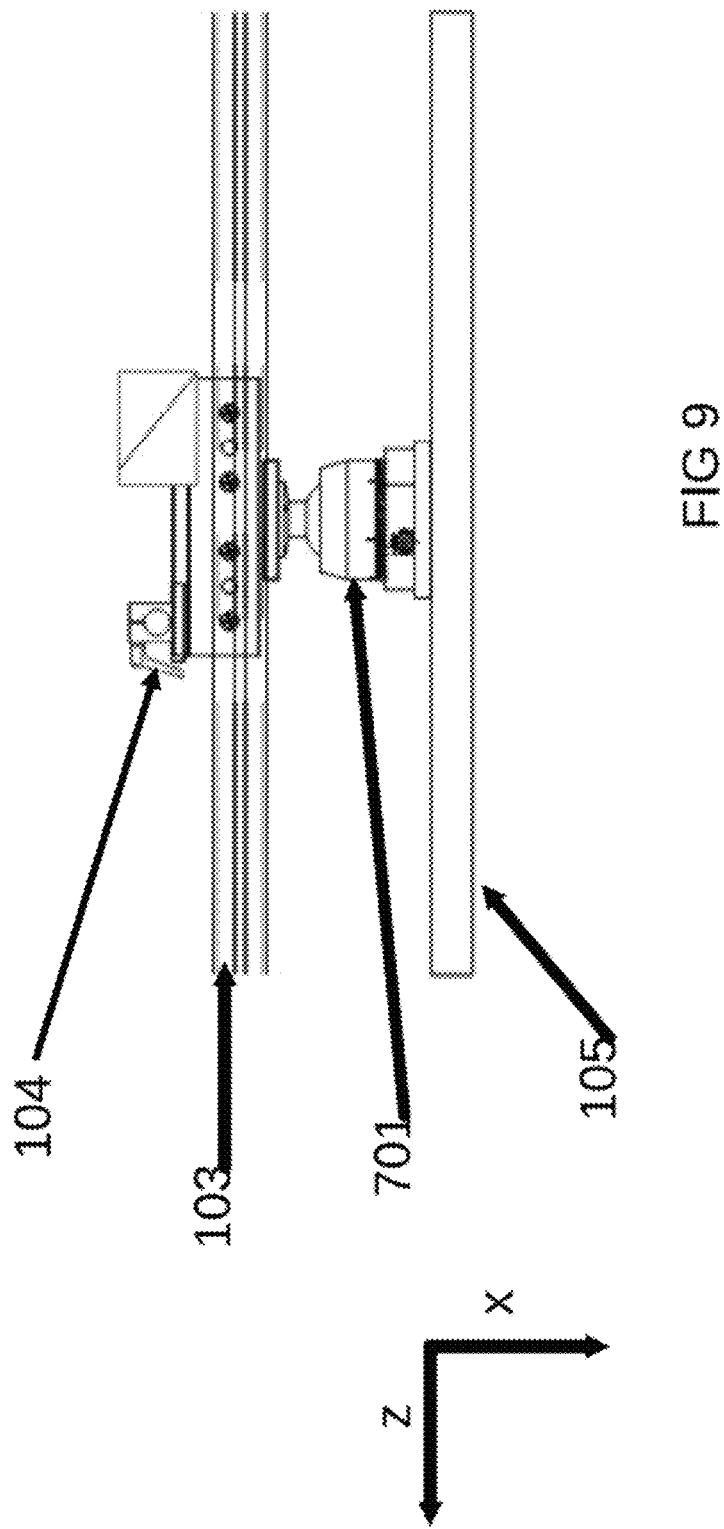
FIG. 9 illustrates a side elevation view of an adjustment element, mounting bracket, and force sensor, according to embodiments of the present disclosure.
Figure 10:
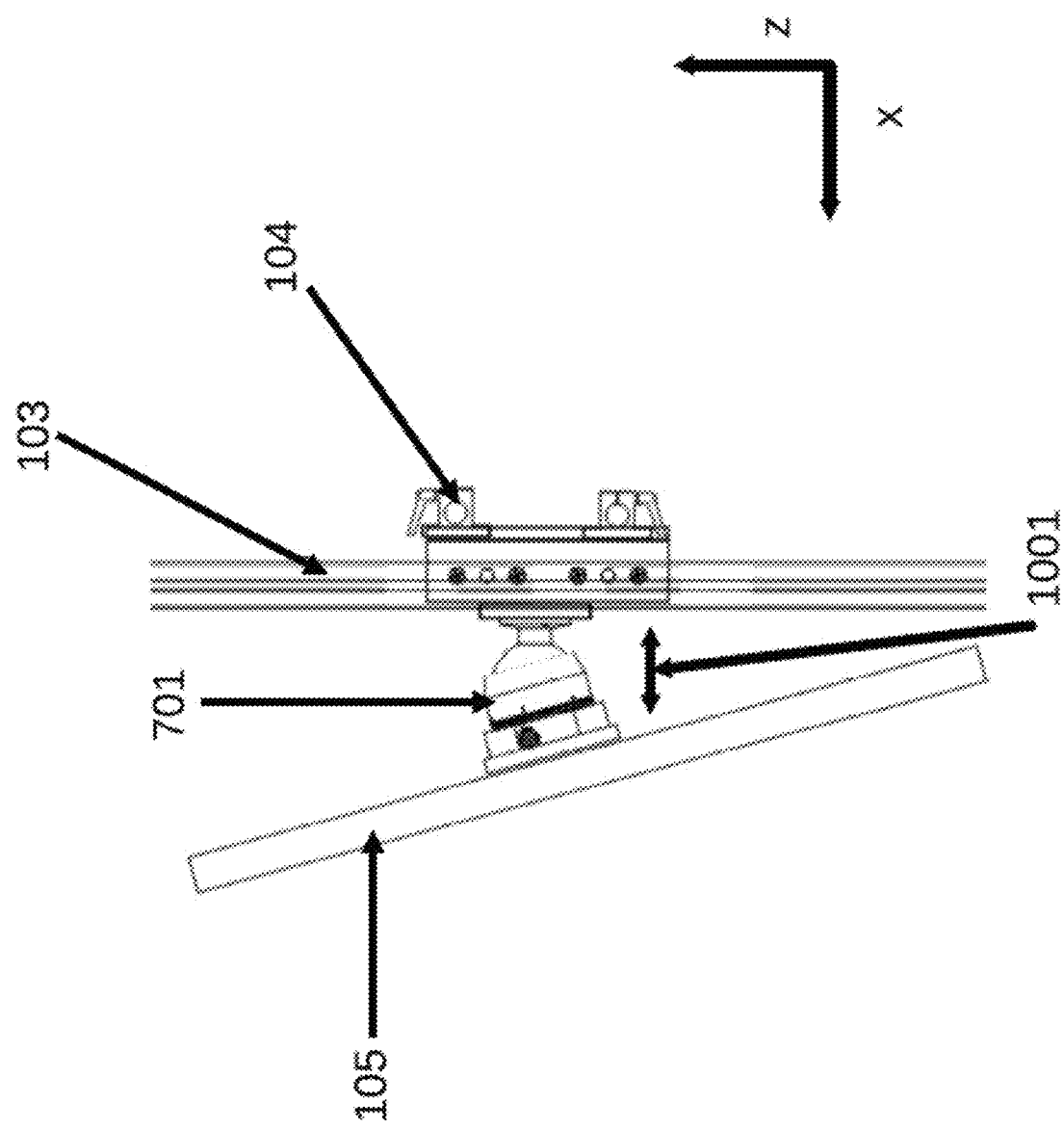
FIG. 10 illustrates a side elevation view of a cross-element, adjustment element, mounting bracket, and force sensor, according to embodiments of the present disclosure.

In some embodiments, as illustrated in FIG. 8, FIG. 9, and FIG. 10, the mounting bracket 701 enables the force sensor 105 to be rotated along a first degree of rotation 801. The mounting bracket 701 can also be designed to enable the force sensor 105 to be rotated along a second degree of rotation 1001. In some cases, the mounting bracket 701 is a quick release ball head. In some embodiments, a climbing hold 109 is configured to attach to the force sensor, as shown in FIG. 1. As used herein, a "climbing hold" can be, but is not limited to, a rock climbing hold, an ice climbing hold, and/or a mixed climbing hold, and can be made of, but not limited to, rock, wood, sand, polymer, polymer composite, metal, or any combination thereof.

Figure 11:
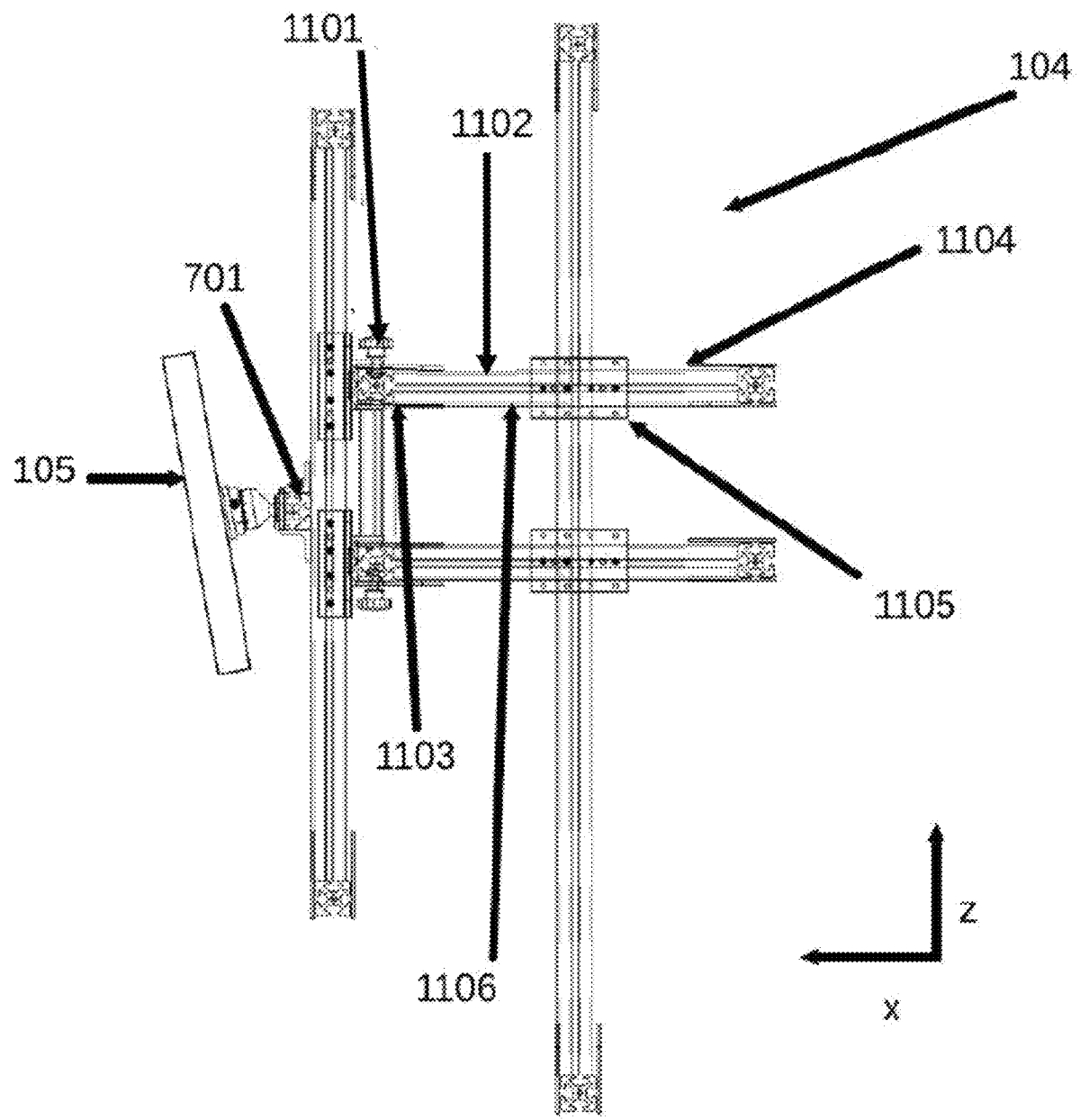
FIG. 11 illustrates a side elevation view of a cross-element, adjustment element, mounting bracket, and force sensor, according to embodiments of the present disclosure.
Figure 12:
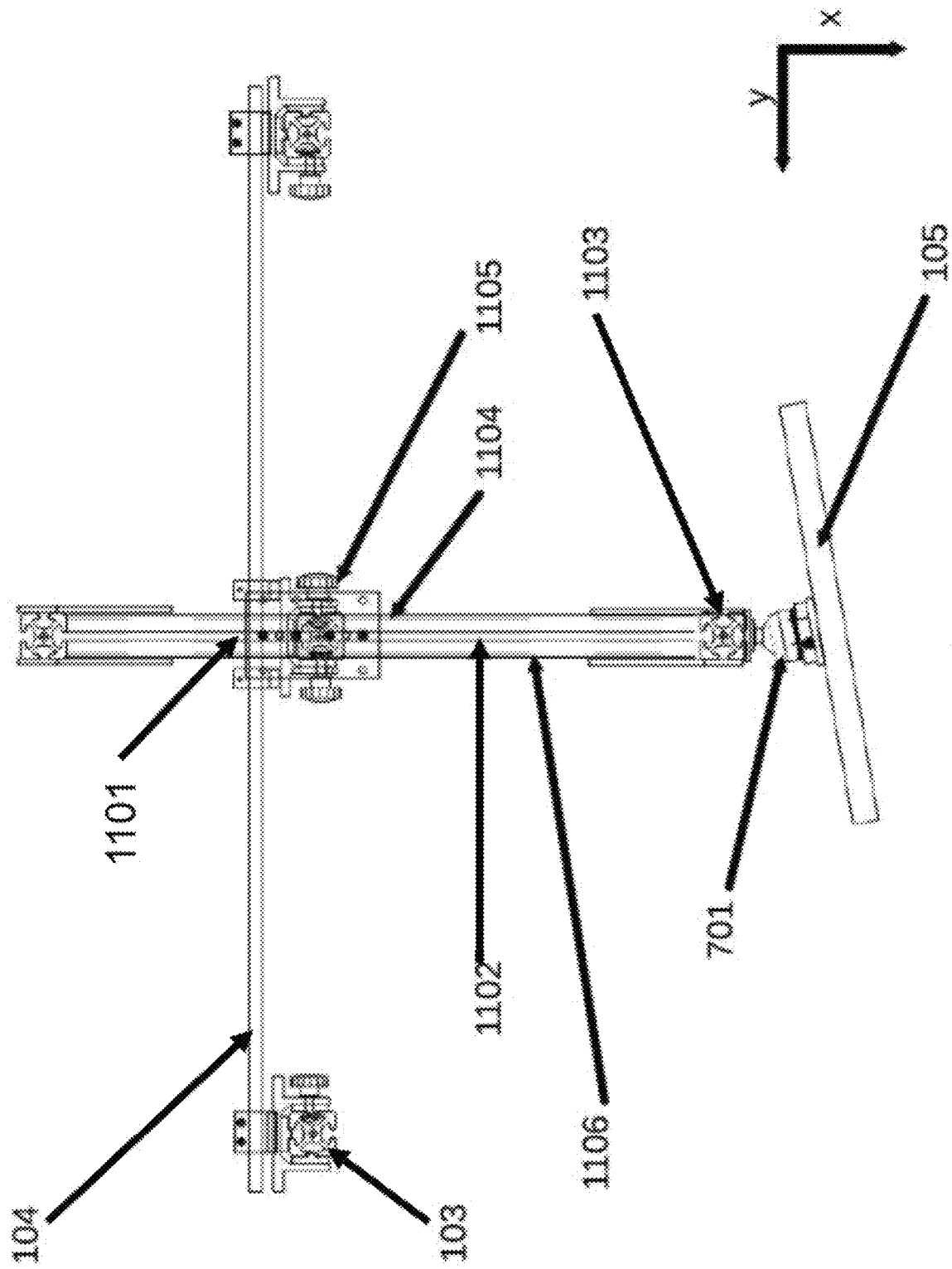
FIG. 12 illustrates a top elevation view of a cross-element, adjustment element, mounting bracket, and force sensor, according to embodiments of the present disclosure.

In some embodiments, as illustrated in FIG. 11 and FIG. 12, the adjustment element 104 has an extending portion 1101 and sliding portion 1102. The sliding portion 1102 has a first end 1103, a second end 1104, a length 1106, and a slide element 1105, in some cases. The extending portion 1101 can be configured to couple with the first end 1103 and the mounting bracket 701. The sliding element 1105 can be configured to couple with the length 1106 of the sliding portion 1102. The sliding portion 1102 can be configured to extend along its length 1106 in relation to the coupling with the slide element 1105, from the first end 1103 to the second end 1104. In some cases, the adjustment element 104, in combination with cross-element 103, and/or the mounting bracket 701, can accommodate adjustment of the force sensor 105 in an x, y, and z-axis direction, and in some cases, angles of rotation 801, 1001, about a point of the mounting bracket 701, as shown in FIG. 12.

Figure 16:
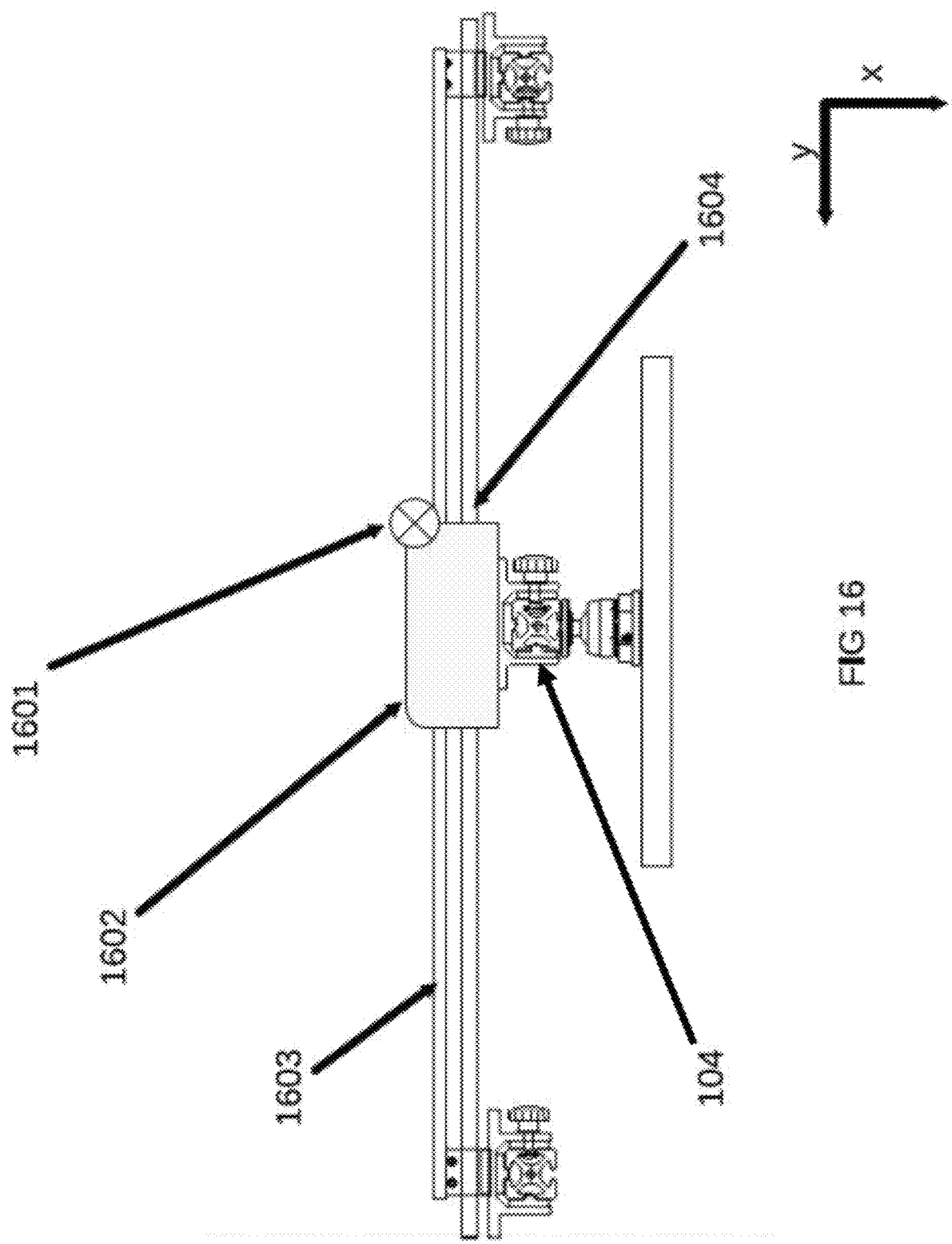
FIG. 16 illustrates a top elevation view of an adjustment element, motor, and location sensor, according to embodiments of the present disclosure.

FIG. 16 illustrates one embodiment in which the cross-element 103 includes a motor 1602 and a location sensor 1601. The motor 1602 can be configured on the cross-element 103 to be coupled to the adjustment element 104. The motor 1602 can also be configured so that it can movably adjust the adjustment element 104 from a first position 1603 to a second position 1604 on the cross-element 103. The location sensor 1601 can be configured to transmit the first position 1603 and the second position 1604 to a processing unit 110. In some cases, the location sensor 1601 is configured to receive a signal from a processing unit 110, and send a signal to the motor 1602, causing the adjustment of the adjustment element 104.

Figure 15:
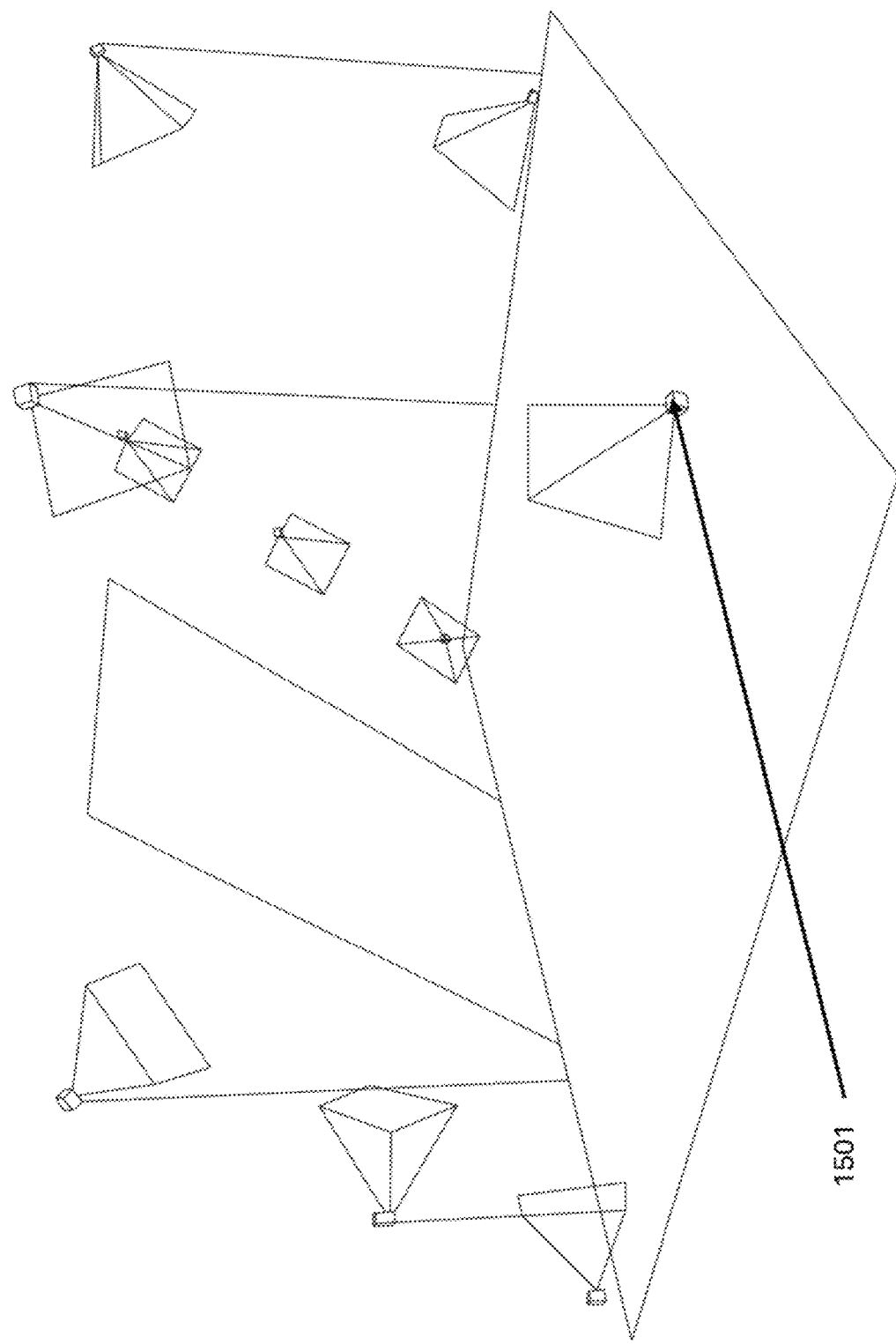
FIG. 15 illustrates a side perspective view of a motion tracking system, according to embodiments of the present disclosure.

FIG. 15 illustrates a motion tracking system 1501 that can be used in combination with an adjustable force sensor system, method of teaching movement, or an adjustable climbing wall system. In some cases, the motion tracking system 1501 is configured to measure a user's position relative to the position of a climbing hold 109, 205. The motion tracking system can be optical such as, but not limited to, passive markers, active markers, time modulated active markers, semi-passive imperceptible markers, markerless; non-optical, such as, but not limited to, inertial, mechanical, magnetic, stretch; radio frequency, LiDAR; or a combination thereof.

Figure 18:
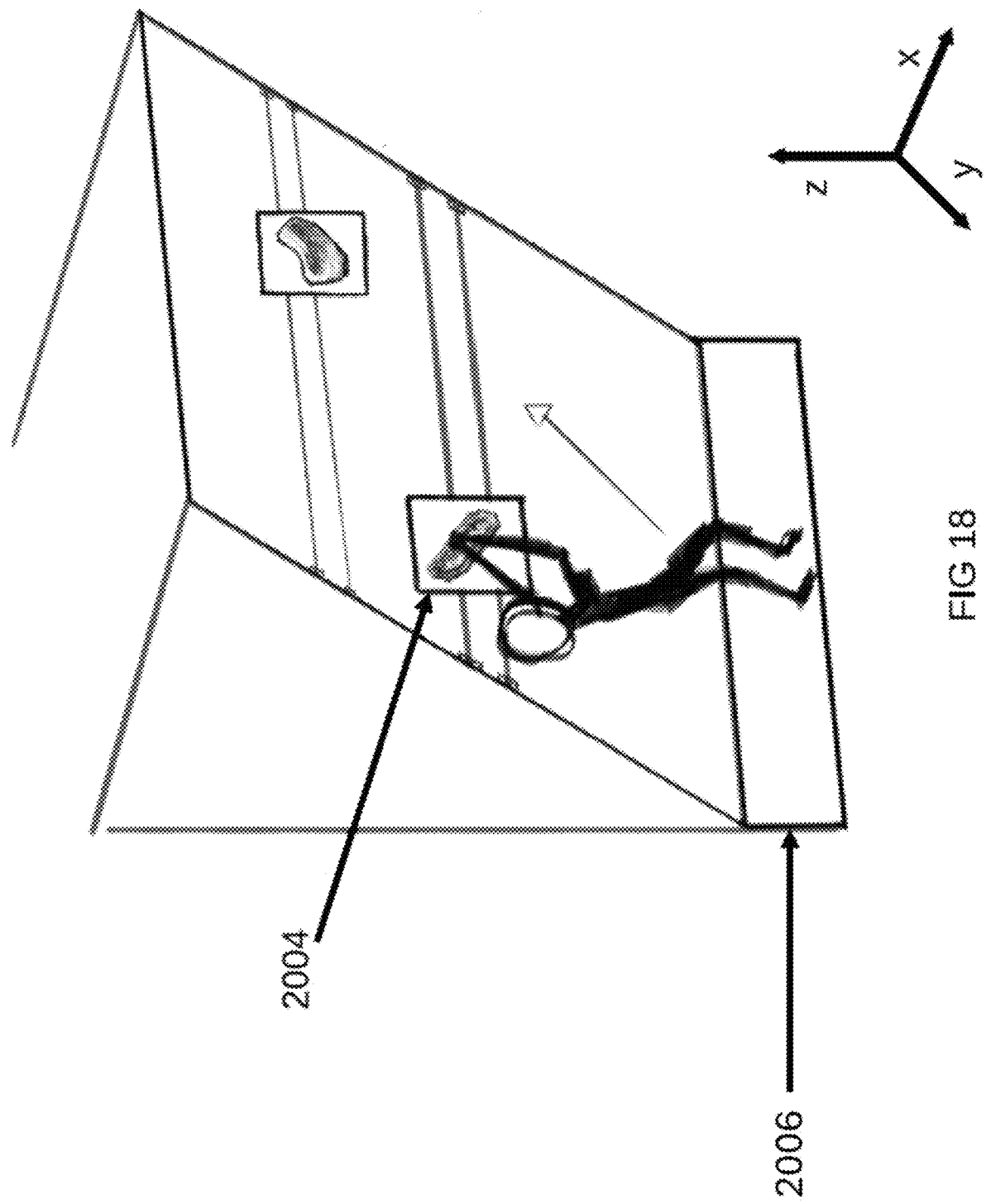
FIG. 18 illustrates a side perspective view of collecting a force measurement on a first force plate, according to embodiments of the present disclosure.
Figure 19:
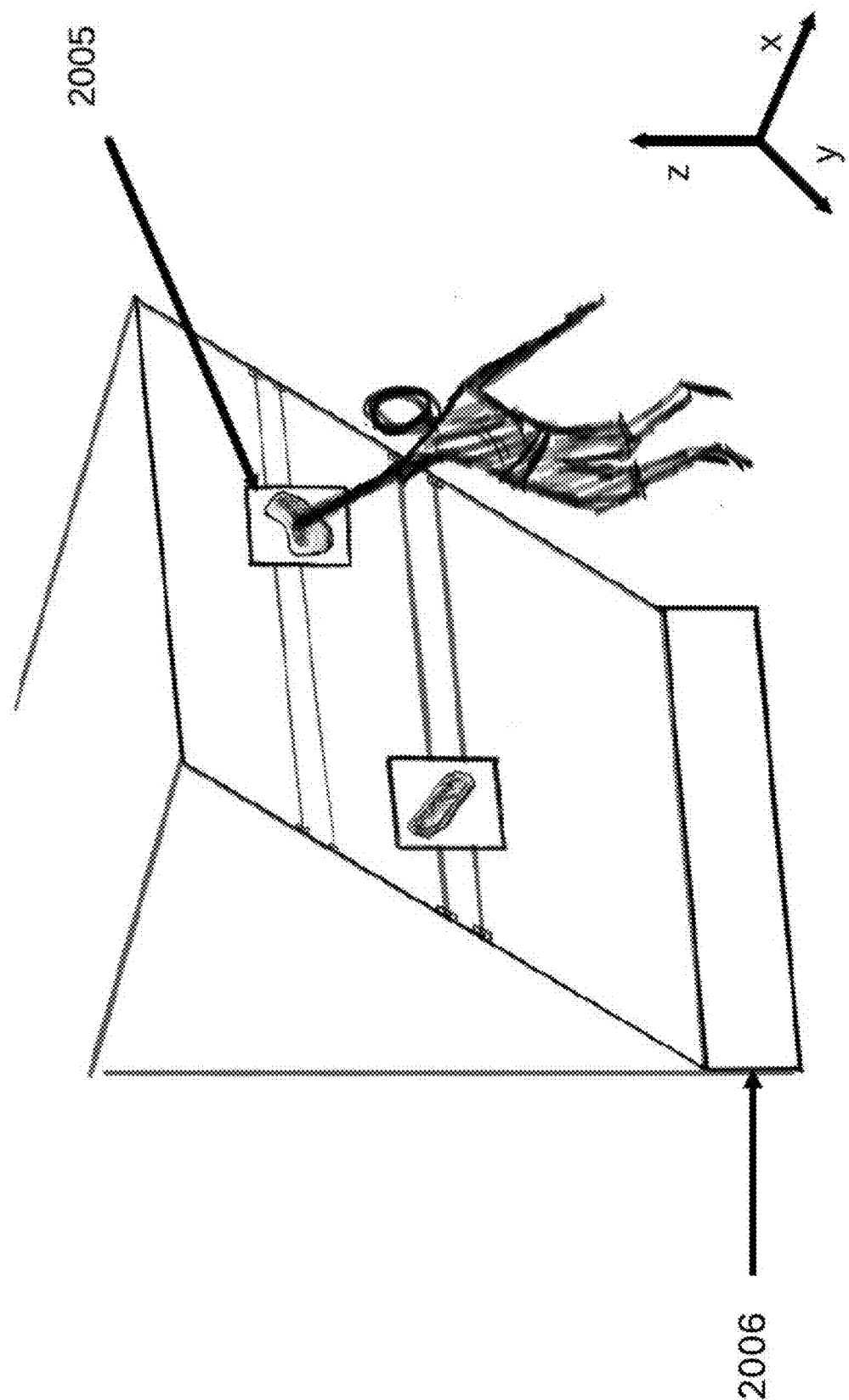
FIG. 19 illustrates a side perspective view of collecting a force measurement on a second force plate, according to embodiments of the present disclosure.
Figure 20:
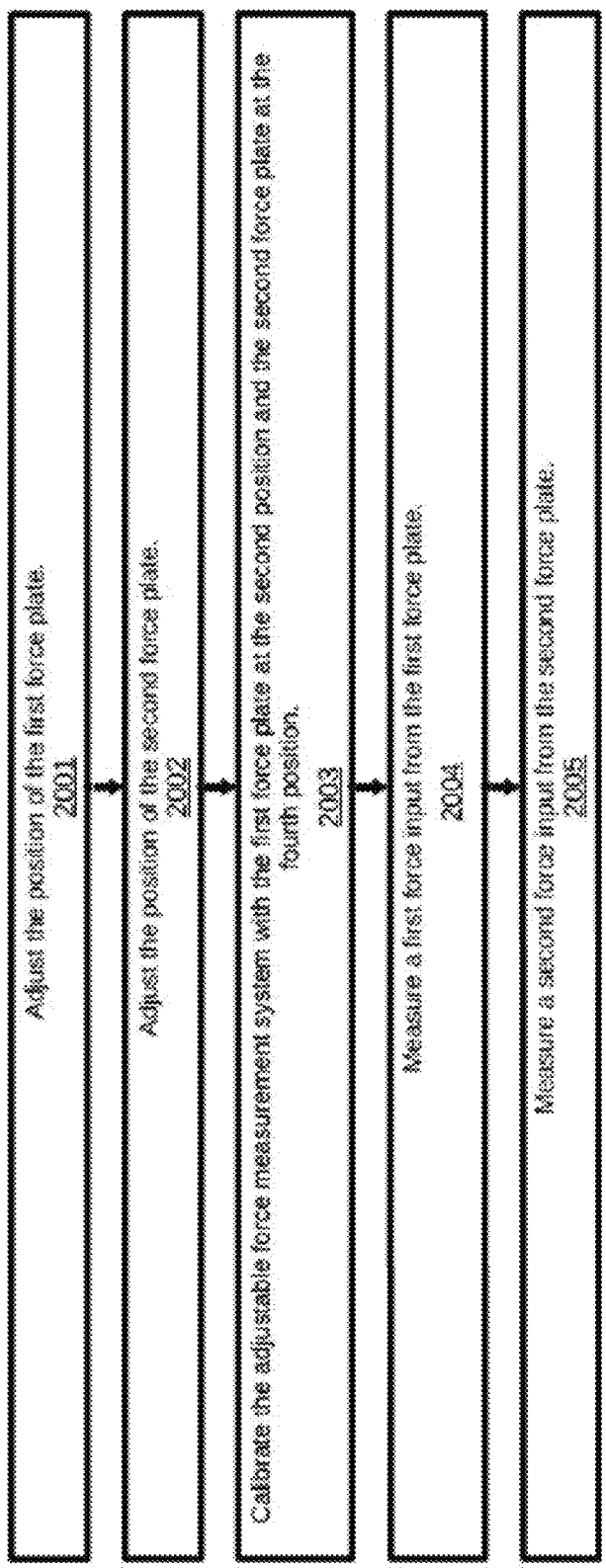
FIG. 20 illustrates a flowchart demonstrating a method of teaching movement, according to embodiments of the present disclosure.

In some embodiments, as illustrated in FIG. 20, FIG. 18, and FIG. 19, a method of teaching a movement involves utilizing an adjustable force sensor system 2003, a first force plate 2001, and a second force plate 2002. A "force plate" as used herein, can include, but is not limited to, a plate designed to accommodate a single or multi-pedestal force sensor of varying transducer types, such as: strain gauges, piezoelectric sensors, capacitance gauges, piezoresistive sensors, or combination thereof. In some embodiments the force sensor has a three-dimensional component, and can be polyhedron shaped and/or a curved solid. In some cases, the force sensor is an AMTI BMS464506 force plate system. The force sensor can be six-axis, but in some cases can be a two-axis device. According to some embodiments, the force plate has a climbing hold attached to it. The adjustable force sensor system 2003 can be positioned in a manner to allow a user to adjust the first force plate at a first position to a second position, 2001, and adjust the second force plate from a third position to a fourth position, 2002, according to some embodiments. The force plates, according to some embodiments, are then calibrated at the second and fourth positions, respectively, zeroing out the gravitational forces associated with the mass of the force plates themselves. As shown in FIG. 18 and FIG. 19 a first force input 2004 and a second force input 2005 applied by a user are measured. Each limb of the user in a closed chain kinetic movement can apply force to a force plate, and in some cases, there are five force plates, one for each limb, and a fifth to which the user moves a limb to, completing a movement.

What is claimed is:

1. An adjustable climbing wall system comprising:
   a subframe element configured to couple to a climbing wall structure;
   a force plate coupled to the subframe element and configured to:
   couple to a climbing hold; and
   translate between a first position and a second position along at least two nonparallel linear directions with respect to the subframe element; and
   a force sensor coupled to the force plate and configured to:
   measure forces exerted on the force plate; and
   output a signal indicative of the measured forces.

2. The adjustable climbing wall system of claim 1, further comprising:
   a rigid frame comprising a first side rail and a second side rail; and
   a bracing element comprising a first end coupled to the first side rail and a second end coupled to the second side rail; wherein the subframe element is configured to move with respect to the bracing element.

3. The adjustable climbing wall system of claim 1, wherein the subframe element is configured to rotatably couple the force plate to the climbing wall structure.

4. The adjustable climbing wall system of claim 1, wherein:
   the subframe element comprises a rail structure; and
   the force plate comprises a slide that couples to the rail structure such that the force plate is configured to move in a linear direction with respect to the subframe element.

5. The adjustable climbing wall system of claim 1, further comprising a coupler that couples the force plate to the subframe element and is configured to vary a distance between the force plate and the climbing wall structure.

6. The adjustable climbing wall system of claim 5, wherein:
   the subframe element is configured to vary the distance along a linear direction; and
   the linear direction is substantially orthogonal to a surface of the climbing wall structure.

7. The adjustable climbing wall system of claim 1, further comprising a motor that is configured to move the force plate between the first and second positions.

8. The adjustable climbing wall system of claim 1, further comprising a locating feature that is configured to retain the force plate in at least one of the first position or the second position.

9. An adjustable force measurements system comprising:
   an inner portion having a cross-element;
   an adjustment element configured to couple with the cross-element, the adjustment element comprising: an extending portion, a sliding portion, and a slide element;
   a force sensor configured to couple with the adjustment element via a mounting bracket; wherein:
   the force sensor is configured to transmit data to a processing unit;
   the inner portion is configured to couple with a framework and/or wall; and
   the extending portion is configured to couple with the sliding portion and the mounting bracket, and the slide element is configured to couple with the sliding portion.

10. The adjustable force measurements system of claim 9 wherein:
    the sliding portion has a first end, second end, and a length; wherein:
    the extending portion is configured to couple with the first end of the sliding portion and the mounting bracket, and
    the sliding portion is configured to move with respect to the slide element along the length of the sliding portion from the first to the second end.

11. The adjustable force measurements system of claim 9 wherein the mounting bracket is configured to rotatably couple the force sensor with the adjustment element along a first degree.

12. The adjustable force measurements system of claim 9 wherein the mounting bracket is configured to rotatably couple the force sensor with the adjustment element along a first degree of rotation and a second degree of rotation.

13. The adjustable force measurements system of claim 9 further comprising a climbing hold configured to couple with a force plate; wherein the climbing hold has a position.

14. The adjustable force measurements system of claim 9 wherein:
    the cross-element comprises a motor and a location sensor, wherein the motor is configured to movably adjust the adjustment element from a first position to a second position; and
    the location sensor is configured to transmit the first and second positions to the processing unit.

15. The adjustable force measurements system of claim 14 further comprising a motion tracking system configured to measure a user position relative to a position of a climbing hold, and transmit the user position to the processing unit.

16. A method of teaching movement having an adjustable force measurement system, an electronic hardware component, and at least a first and a second force plate, the method comprising:
collecting user movement data on the adjustable force measurement system through a procedure including:
preparing the adjustable force measurement system through a procedure including:
adjusting the first force plate at a first position to a second position and the second force plate at a third position to a fourth position using the adjustable force measurement system,
calibrating the adjustable force measurement system with the first force plate at the second position and the second force plate at the fourth position using the electronic hardware component;
measuring a first force input from the first force plate using the adjustable force measurement system,
measuring a second force input from the second force plate using the adjustable force measurement system.

17. The method of claim 16 wherein:
the first force plate comprises a first force plate and first climbing hold, the second force plate comprises a second force plate and a second climbing hold.

18. The method of claim 16 further comprising:
measuring a third force input from the first force plate at the second position using the adjustable force measurement system,
measuring a fourth force input from the second force plate at the fourth position using the adjustable force measurement system.

* * * * *